US011980136B2

(12) United States Patent
Baert

(10) Patent No.: US 11,980,136 B2
(45) Date of Patent: May 14, 2024

(54) HYDRAULICALLY POWERED BALER

(71) Applicant: HYLER BVBA, Sint-Baafs-Vijve (BE)

(72) Inventor: Niels Baert, Sint-Baafs-Vijve (BE)

(73) Assignee: HYLER BVBA, Sint-Baafs-Vijve (BE)

(*) Notice: Subject to any disclaimer, the term of this patent is extended or adjusted under 35 U.S.C. 154(b) by 162 days.

(21) Appl. No.: 17/280,348

(22) PCT Filed: Sep. 18, 2019

(86) PCT No.: PCT/EP2019/075019
§ 371 (c)(1),
(2) Date: Mar. 26, 2021

(87) PCT Pub. No.: WO2020/064460
PCT Pub. Date: Apr. 2, 2020

(65) Prior Publication Data
US 2022/0030773 A1 Feb. 3, 2022

(30) Foreign Application Priority Data

Sep. 27, 2018 (FR) ........................................ 1858848

(51) Int. Cl.
A01F 15/08 (2006.01)
A01D 85/00 (2006.01)
A01F 15/10 (2006.01)

(52) U.S. Cl.
CPC ........ *A01F 15/0841* (2013.01); *A01D 85/005* (2013.01); *A01D 2085/008* (2013.01); *A01F 2015/103* (2013.01)

(58) Field of Classification Search
CPC ............ A01F 15/0841; A01F 2015/103; A01F 2015/102; A01D 2085/008

USPC ........................................................ 100/179
See application file for complete search history.

(56) References Cited

U.S. PATENT DOCUMENTS

| | | | |
|---|---|---|---|
| 2015/0296714 A1* | 10/2015 | Dreher | B30B 9/30 100/96 |
| 2017/0196170 A1* | 7/2017 | Benevelli | A01F 15/042 |
| 2018/0098502 A1* | 4/2018 | Kraus | B30B 9/306 |
| 2019/0224934 A1* | 7/2019 | Ostermann | A01F 15/0841 |

FOREIGN PATENT DOCUMENTS

| | | |
|---|---|---|
| EP | 0346586 A2 | 12/1989 |
| EP | 3308635 A1 | 4/2018 |

OTHER PUBLICATIONS

International Search Report for the International Patent Application No. PCT/EP2019/075019, dated Dec. 3, 2019, 2 pages.

* cited by examiner

*Primary Examiner* — Matthew Katcoff
*Assistant Examiner* — Mohammed S. Alawadi
(74) *Attorney, Agent, or Firm* — KDW Firm PLLC

(57) ABSTRACT

A machine for making bales from plant matter includes a compression chamber, a conveying device for conveying the plant matter into the compression chamber, a piston able to move in the compression chamber in order to compress the plant matter, and a drive device for driving the translational movement of the piston. The drive device further includes a hydraulic device comprising a hydraulic pump connected to the coupling member, a hydraulic motor powered by the hydraulic pump, a drive member driven by the hydraulic motor and configured to move the piston in a translational movement, and a control device for controlling the movement of the piston.

11 Claims, 4 Drawing Sheets

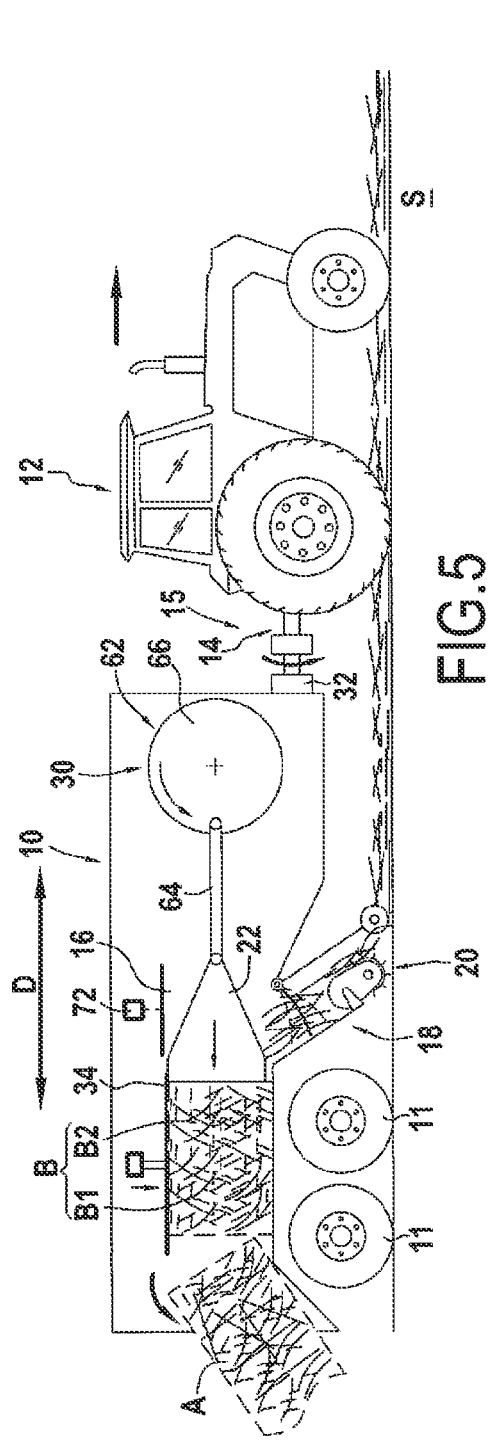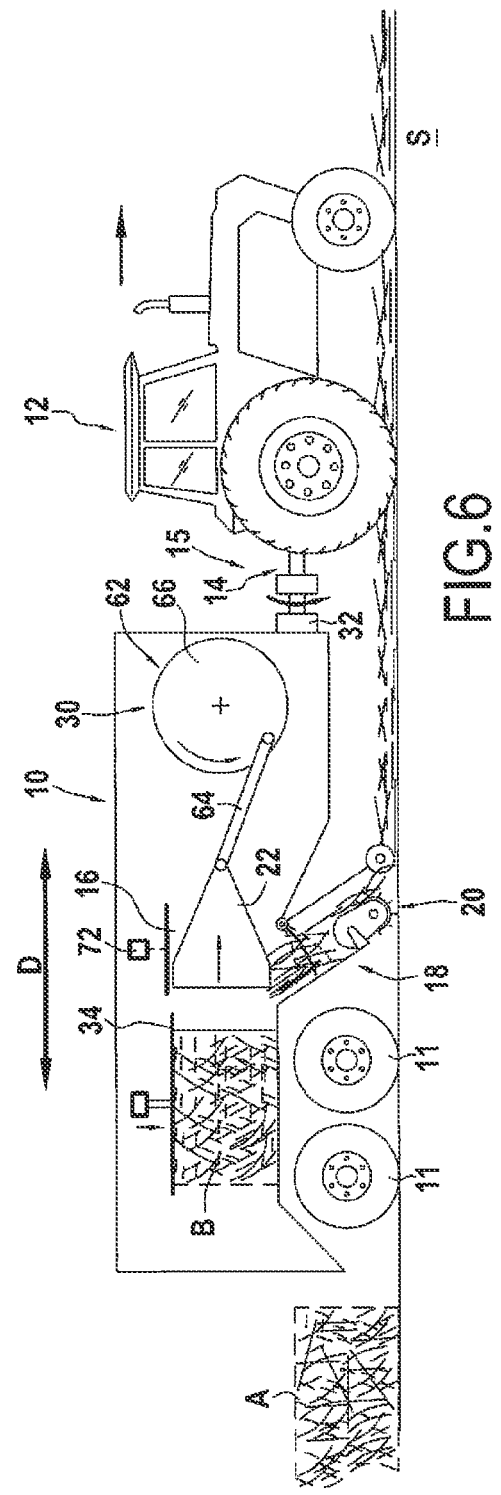

HYDRAULICALLY POWERED BALER

This is a national stage application filed under 35 U.S.C. § 371 of pending international application PCT/EP2019/075019, filed Sep. 18, 2019, which claims priority to French Patent Application No. 1858848, filed Sep. 27, 2018, the entirety of which applications are hereby incorporated by reference herein.

BACKGROUND OF THE INVENTION

The invention relates to the field of machines for making bales from plant matter. This type of machine is generally called "baler". This invention more precisely relates to a machine for making bales having a substantially parallelepipedic form. Such bales are generally called "rectangular bales".

Traditionally, the machines for making the bales include:
a compression chamber;
a conveying device for conveying the plant matter into the compression chamber;
a piston able to move with a translational movement within the compression chamber in order to compress the plant matter;
a drive device having a coupling member arranged to be connected to a rotating drive element, the drive device being further arranged to actuate the piston with a translational movement.

Such a machine is, in particular, described in the document EP 0 346 586.

This type of machine generally comprises an eccentric transmission device associated to a flywheel, the eccentric transmission device being arranged to transform a rotational movement, generated by the rotating drive element—generally a power take-off of a tractor—into a translational movement of the piston.

Traditionally, the flywheel starts to move and the piston makes a translational movement as soon as the power take-off of the tractor starts its rotation. This makes it possible to move the piston immediately. It is understood that the starting of the machine, and in particular the setting in rotation of the flywheel, consume much energy.

In addition, the piston moves back and forth within the compression chamber as long as the flywheel turns, and this whatever the filling rate of the compression chamber.

Moreover, the power that the rotating drive element must provide, namely the power take-off of the tractor, presents a peak at each time the piston compresses the plant matter contained into the compression chamber, which is constraining for the components of the tractor.

In the traditional machines, the plant matter is collected and introduced into a pre-compression chamber. The drive device and the piston operate continuously. The plant matter contained into the pre-compression chamber is then pushed into the compression chamber at the time when the piston is at the bottom dead center. Because of an irregular filling speed of the compression chamber, or because of an irregular picking up of the plant matter, the piston carries out sometimes up to 60 back and forth strips before the compression chamber contains the sufficient quantity of plant matter to form a bale, which constitutes an useless loss of energy.

OBJECT AND SUMMARY OF THE INVENTION

An aim of the invention is to propose a machine for making bales of a rectangular form from plant matter that requires less energy than the traditional machines to form bales.

The invention achieves its aim by the fact that the drive device further comprises:
a hydraulic device comprising
a hydraulic pump connected to the coupling member;
a hydraulic motor powered by the hydraulic pump;
a drive member driven by the hydraulic motor and configured to move the piston in a translational movement; and
a control device connected to the hydraulic device for controlling the movement of the piston.

During the first setting in rotation of the drive element, such as, for example, the power take-off of the tractor, only the driveshaft of the hydraulic pump is rotated via the coupling member. Consequently, the hydraulic motor is not immediately rotated so that the drive member and the piston are not moved. Also, the startup of the machine according to the invention requires substantially less power than the machine according to the prior art.

Moreover, the movement of the piston can be ordered when it is decided to carry out the pressing operation, which makes it possible to avoid to operate the piston whereas the compression chamber is not sufficiently filled or is empty. In order to do this, the control device acts on the hydraulic device, in particular on the pump and/or the motor, to actuate the hydraulic motor, which causes the movement of the piston into the compression chamber. The movement of the piston into the compression chamber is advantageously ordered when the latter contains sufficiently of vegetable matter, in order to carry out the pressing. A portion of pressed bale is then obtained. Then, the piston moves in a direction opposed to the pressing direction in order to release the compression chamber. Plant matter is then conveyed into the compression chamber until filling of the latter. Once that the compression chamber is sufficiently filled, the piston is moved in order to press a second bale portion, and so on, until forming a complete bale. It is understood that the complete bale consists in several juxtaposed, pressed and preferably tied up together bales portions.

The control device can be manually or automatically operated as explained below.

The machine according to the invention can thus be devoid of a flywheel. The machine can also be devoid of a pre-compression chamber.

It is, in addition, understood that the control device is connected to the hydraulic pump and/or the hydraulic motor, and is configured to control and/or regulate the hydraulic motor supply.

Advantageously, the machine according to the invention further includes at least one sensor, provided into the compression chamber, in order to determine the filling rate of the compression chamber, said sensor being connected to the control device, and the control device is configured to actuate the movement of the piston when the filling rate is higher than a predetermined threshold.

This sensor includes for example plates on which the plant matter press when it occupy a significant and predefined volume within the compression chamber. Without leaving the scope of this invention, the compression chamber could be provided with several sensors.

The filling rate can also be a filling level.

Also, thanks to the invention, the piston is only actuated from the moment where it was detected that the compression chamber is sufficiently filled. The machine according to the invention is thus more efficient than traditional machines, since the piston is moved from the moment where the sufficient quantity of plant matter is present within the compression chamber to form a rectangular bale, and not in an uninterrupted way as in prior art.

Advantageously, the drive member comprises a device of the rod/crank type. Preferably, it includes a wheel or a drum, not necessarily an inertial one, acting as rod, which is connected to the piston via a rod.

Advantageously, the hydraulic pump is of a variable flow-rate type, preferably a variable displacement type. An interest is to be able to modulate the flow-rate and thus the power delivered to the hydraulic motor.

Preferably, the control device is also configured to modify the displacement of the hydraulic pump.

Advantageously, the hydraulic motor is of a variable flow-rate type, preferably a variable displacement type, which allow to control the force provided to the piston.

The control device is advantageously configured to adjust the displacement of the hydraulic motor. Preferably, the hydraulic motor is regulated so that the hydraulic pressure is constant and maximal.

According to a particularly advantageous aspect of the invention, the hydraulic device further includes at least a hydraulic accumulator connected to the hydraulic pump.

During the starting of the machine, the hydraulic pump is rotated and loads the accumulator. The piston is not moved.

The accumulator behaves like a reserve of power and allows, in particular, to compensate for a power variation between the power consumed by the motor and the power available on the drive device. This allows to substantially reduce the necessary power with respect to a traditional machine.

Advantageously, the hydraulic accumulator is further connected to the hydraulic motor.

This provides several advantages.

During the return stroke of the piston, after the pressing operation, the hydraulic motor can operate reversely such as a hydraulic pump, and thus reload the hydraulic accumulator. In other words, the hydraulic motor is advantageously reversible. The recovered hydraulic power is then stored into the hydraulic accumulator and can advantageously be re-used during a later phase of movement of the piston. This device allows to substantially reduce the requires energy with respect to a traditional machine.

An energy recovery can also take place in the event of braking of the piston movement, or during a deceleration phase of the hydraulic motor.

Advantageously, the control device further includes a measuring device intended to determine a force applied by the piston to the plant matter. This force is preferentially determined by means of the torque value of the eccentric and its angular position. The torque of the eccentric is in particular determined by measurement of the hydraulic pressure. Insofar as the hydraulic pressure can be measured in a precise way, it follows that the invention advantageously makes it possible to determine in a precise way the force applied by the piston to the plant matter.

The determination of the force applied by the piston to the plant matter advantageously makes it possible to determine the density of the bale, that can change according to moisture and/or to the ambient temperature. Also, the power delivered by the hydraulic motor on the piston could be adjusted according to the density of the bale during its formation.

According to a preferential, but nonexclusive embodiment the machine is towed by a tractor, and also the rotating drive element is a power take-off of the tractor.

According to an alternative, said machine is self-propelled. In this case, the drive element is a rotating shaft of the machine.

In a known way, the machine according to the invention further includes a tying device to tie the bales using wires before evacuation of the bale.

BRIEF DESCRIPTION OF THE DRAWINGS

The invention will be better understood at the reading of the following description of a mode of implementation of the invention given as a nonrestrictive example, with reference to the annexed drawings, on which:

FIG. 5 illustrates a subsequent pressing phase during which the second portion of the new bale is formed;

FIG. 6 illustrates the return of the piston, the new bale being formed while the preceding bale is on the ground.

DETAILED DESCRIPTION OF THE INVENTION

Figure 1:
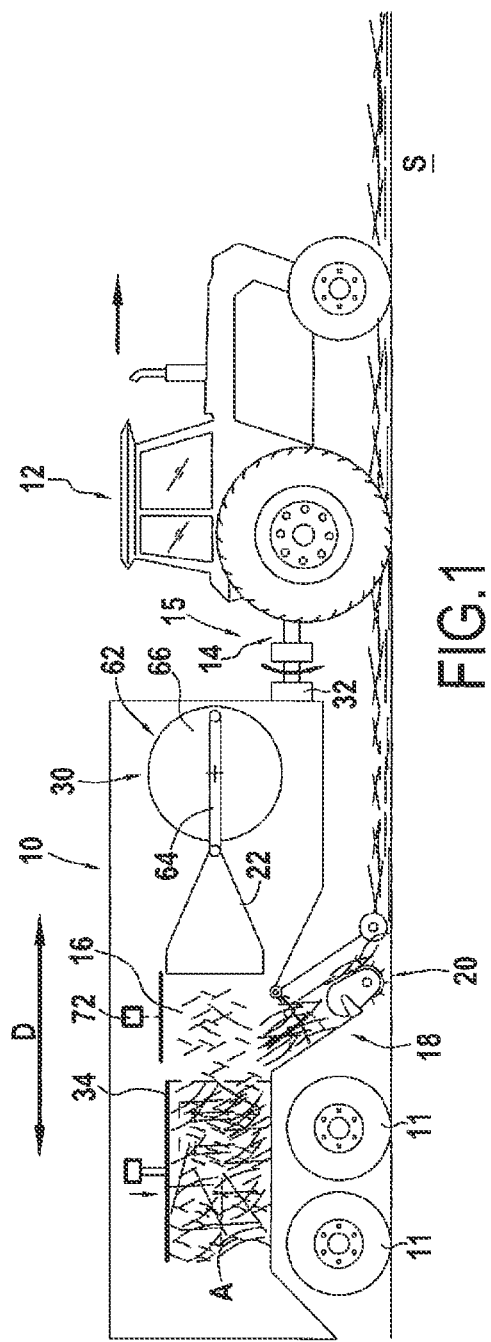
FIG. 1 is a diagrammatic view of the machine according to the invention, towed by a tractor, the plant matter being conveyed into the compression chamber in order to form a new bale.

Illustrated on FIGS. 1 to 6, is an example of a machine 10 according to the invention for making bales B, known as "rectangular" from plant matter V, such as straw, for example. This machine can be moved with respect to the ground S. In this example, the machine 10 is towed by a tractor 12, otherwise known, which includes, at a rear part, a rotating drive element 14, generally called "power take-off".

To allow its displacement, the machine 10 includes wheels 11.

In this example, the plant matter consist in stems, beforehand cut and gathered on the ground as longitudinal piles.

The machine 10 comprises, in a known way, a compression chamber 16 within which the straw is pressed to form a rectangular bale, and a conveying device 18 for conveying the plant matter into the compression chamber 16. In a known way, the conveying device 18 is associated to a collecting device 20 intended to collect the straw and to direct it towards the conveying device 18. The collecting device 20 will consist in a drum driven in rotation in the opposite direction of the conveying direction of the machine 10. The conveying devices are otherwise known. For example, a comb making a back and forth movement will be used to push the straw into the compression chamber 16.

To compress the straw and form the bales, the machine 10 includes a piston 22 which is able to move in a translational movement according to a direction D within the compression chamber. The machine 10 further includes a drive device 30 which is arranged to drive the piston 22 in a translational movement. This drive device includes a coupling member 32 arranged to be connected to the rotating drive element 14, i.e. the power take-off 15 of tractor 12.

In a known way, the machine 10 includes at least one tension plate 34 provided in an upper part of the compression chamber 16, this tension plate having for function to exert a pressure on the bale during formation. Side tension plates can also be provided (non-illustrated herein).

Figure 7:
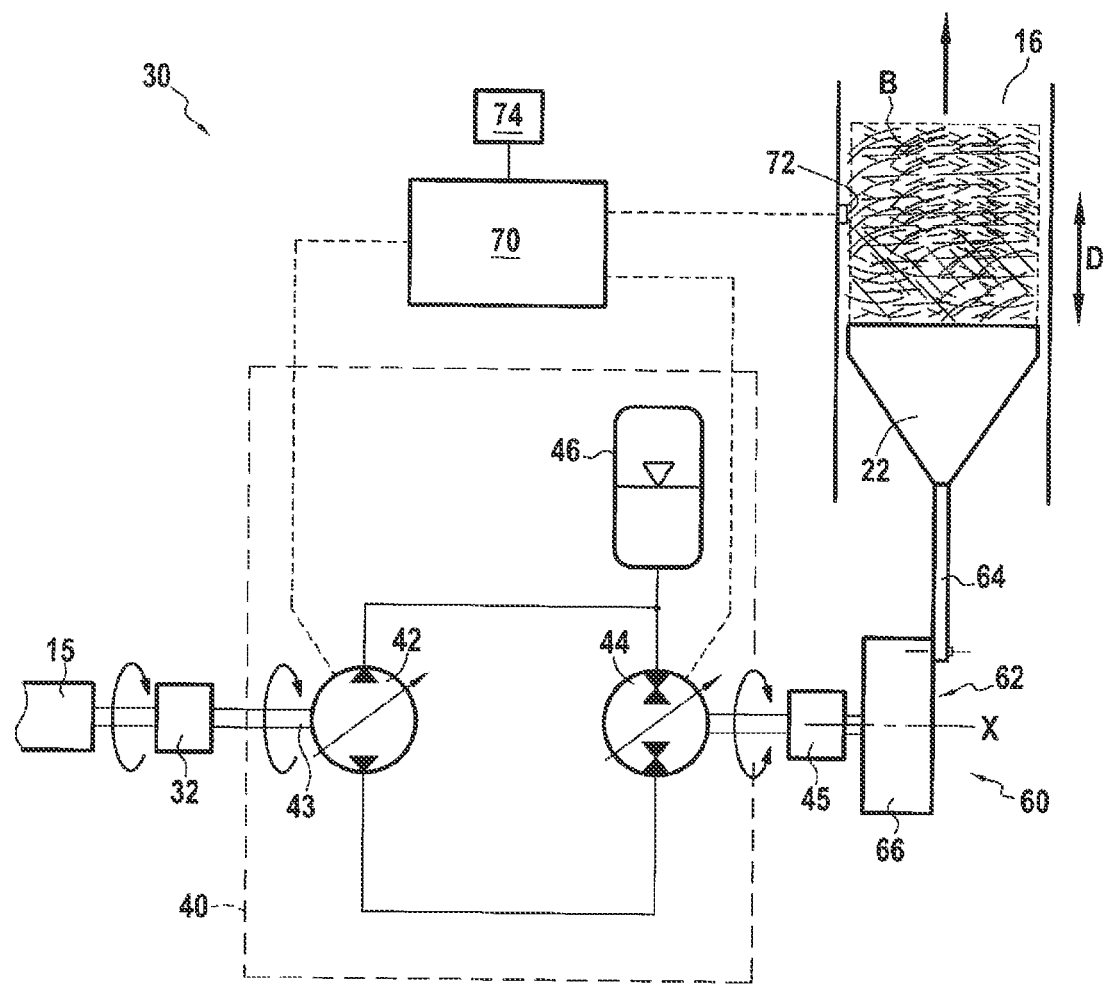
FIG. 7 is a diagrammatic view of the hydraulic circuit of the machine according to the invention.

In accordance to the invention the drive device 30 further includes a hydraulic device 40, as illustrated on FIG. 7. This hydraulic device 40 comprises a hydraulic pump 42 connected to the coupling member 32. As exposed above, the coupling member 32 is connected to the power take-off 15 of the tractor. We thus understand that the rotation driving of the power take-off 15 of the tractor causes the shaft 43 of the hydraulic pump 42 to rotate, via the coupling member 32. In this example, the hydraulic pump 42 is of the type with a variable displacement.

The hydraulic device 40 further comprises a hydraulic motor 44 which is powered by the hydraulic pump 42. In this example, the hydraulic motor 44 is reversible. It can thus operate as a pump. Moreover, the motor is of the variable displacement type.

As is viewed on FIG. 7, in this example, the hydraulic device 40 further includes at least a hydraulic accumulator 46 that is connected to the hydraulic pump 42, on the one hand, and to the hydraulic motor 44, on the other hand.

Coming back to FIG. 7, we can see that the drive device 30 further includes a drive member 60 which is driven by the hydraulic motor 44 and which is configured to move the piston 22 in a translational movement in the direction D. In this example, the drive member 60 includes a device 62 of the rod/crank type, which includes a rod 64 swivellingly connected to the piston 22. The device 62 further includes an eccentric 66, acting as a crank, which is connected to rod 64, on the one hand, and to the hydraulic motor 44, on the other hand. In this example, a reduction box 45 is provided between the hydraulic motor 44 and the eccentric 66.

In accordance to the invention, the drive device 30 further includes a control device 70 which is connected to the hydraulic device for controlling the movement of the piston. In this example, the control device 70 is configured to control the hydraulic pump 42 and the hydraulic motor 44.

In this embodiment, the machine 10 further includes at least a sensor 72, provided into the compression chamber, in order to determine the filling rate of the compression chamber 16. This sensor 72 is connected to the control device. In this example, the sensor 72 includes one or more plates actuated by the plant matter when the compression chamber is filled with straw. The pressure exerted by the straw on the plates is such that it triggers a signal representative of the filling rate of the compression chamber.

In an advantageous way, the control device 70 is configured to actuate the movement of the piston 22 when the filling rate measured by the sensor 72 is higher than a predetermined threshold.

In addition, the machine further includes a measuring device 74 intended to determine the force applied by the piston 22 to the plant matter. To do this, in this example, the measuring device 74 uses the torque exerted by the eccentric 66 as well as its angular position about its rotating axis X. These values are determined by suitable sensors (non-illustrated herein).

Using FIGS. 1 to 6, now the operation of the machine 10 according to the invention will be explained.

When starting the tractor, the compression chamber 16 being empty, the rotation driving of the power take-off 15 causes the hydraulic pump 42 to rotate. At this time, the machine does not carry out any movement, the piston remains motionless and the conveying device is also motionless since not any forward speed is detected. Consequently, there is no or very little energy consumption to operate the machine at this time. In this example, the formation of a new bale B is illustrated in FIG. 1, being specified that a first bale A was previously formed.

When starting the tractor, the torque at the power take-off 15 increases until the accumulator 46 is completely loaded with the pump 42. After driving the machine 10 in motion with respect to the ground, the collecting device 20 and the conveying device 18 are operated and convey the straw into the compression chamber 16.

Figure 2:
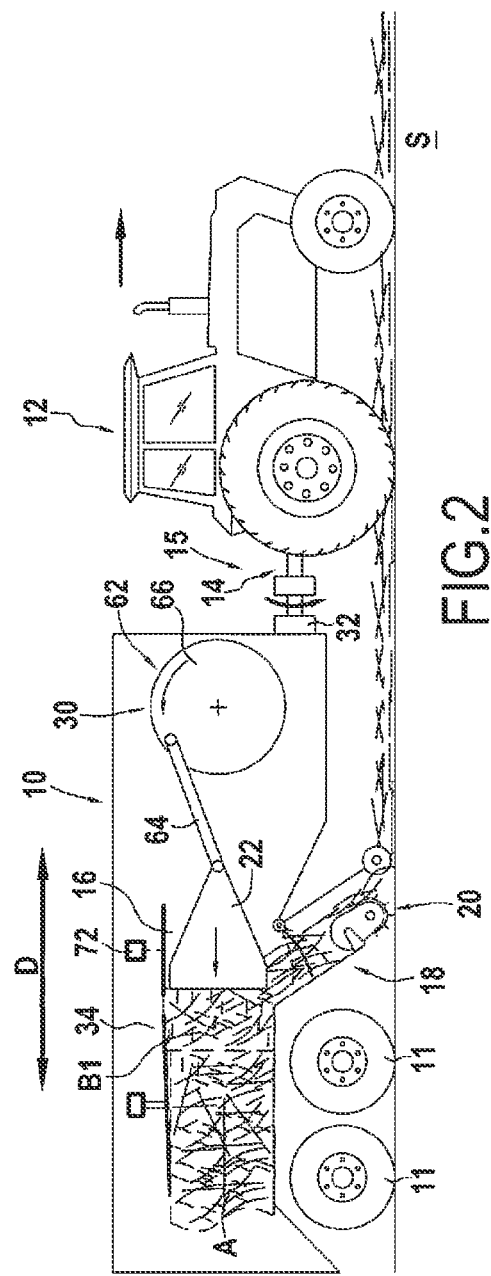
FIGS. 2 and 3 illustrate the machine of FIG. 1 during a pressing phase, by movement of the piston in the compression chamber, in order to form a first portion of the new bale.
Figure 3:
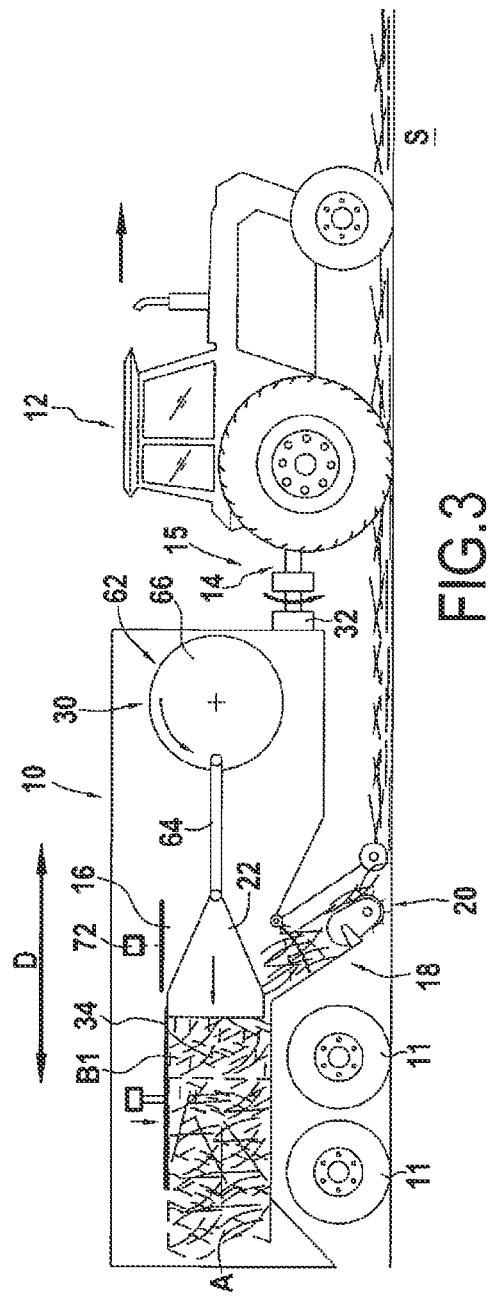

When sensor 72 has determined that the compression chamber 16 is sufficiently filled, the control device actuates the movement of the piston 22, as illustrated on FIGS. 2 and 3. The piston then compresses the plant matter in order to form a first portion B1 of the bale B. It is understood that the first portion B1 is compressed between first bale A and the piston. Concurrently, the tension plate 34 exerts a pressure on the top of the first portion B1 of the bale during formation. In other words, as long as the compression chamber 16 is not sufficiently filled, the piston 22 does not move, contrarily to prior art where the piston is constantly actuated with a back and forth movement.

Figure 4:
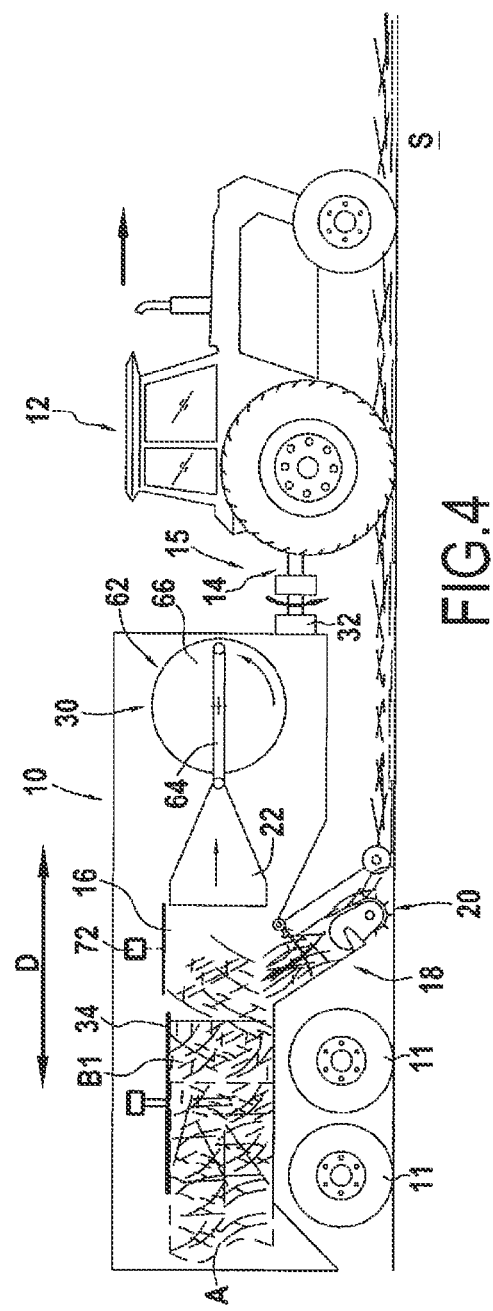
FIG. 4 illustrates the return of the piston, and the filling of the compression chamber.

As illustrated on FIG. 4, after the first pressing and the formation of the first portion B1, the piston moves back in order to release the compression chamber 16.

Once that the latter is again sufficiently filled thanks to the conveying means, the piston is actuated in order to compress the plant matter between the first portion B1 and the piston, which creates a second portion B2 of the bale B, such as illustrated on FIG. 5.

It is understood that the first and second portions B1 and B2 are juxtaposed and form the bale B. In this illustrative example, the bale B is completed at the end of two pressing cycles. Moreover, the first and second portions B1 and B2 are tied together by adapted means, otherwise known.

In the practice, about twenty back and forth cycles of the piston can be envisaged in order to form a standard bale of 2.4 meters length, 1.2 meters height and 0.9 meter width.

As illustrated on FIG. 5, during the formation of the second bale B, the first bale A is progressively pushed towards the downstream exit of the machine, up to the moment where it falls on the ground.

FIG. 6 illustrates the return of the piston after formation of the bale B.

The bale B is progressively tied during the progression of its formation thanks to tying devices, otherwise known and non-illustrated herein.

According to an advantageous aspect, during the return of the piston 22 towards the eccentric, the motor 44 operates as a hydraulic pump and generates hydraulic energy which is stored into the accumulator 46. This energy could be used for a later pressing phase.

The invention claimed is:

1. A machine for making bales from plant matter, said machine being movable with respect to the ground and including:
    a compression chamber;
    a conveying device for conveying the plant matter into the compression chamber;
    a piston able to move in a translational movement within the compression chamber in order to compress the plant matter;
    a drive device having a coupling member arranged to be connected to a rotating drive element, the drive device being further arranged to actuate the piston in a translational movement;
    wherein the drive device further includes:
        a hydraulic device comprising a hydraulic pump connected to the coupling member;
        a hydraulic motor powered by the hydraulic pump; and a drive member driven by the hydraulic motor and configured to move the piston in the translational movement; and a control device connected to the hydraulic device for controlling the movement of the piston;

wherein the machine is devoid of a flywheel configured to behave as a reserve of power.

2. The machine of claim 1, further comprising at least a sensor for determining a filling rate of the compression chamber, said sensor being connected to the control device, and wherein the control device is configured to actuate the movement of the piston when the filling rate is higher than a predetermined threshold.

3. The machine of claim 1, wherein the drive member includes a rod/crank device.

4. The machine of claim 1, wherein the hydraulic pump is a variable flow-rate type pump.

5. The machine of claim 1, wherein the hydraulic motor is a variable flow-rate type motor.

6. The machine of claim 1, wherein the hydraulic motor is reversible.

7. The machine of claim 1, wherein the hydraulic device further includes at least a hydraulic accumulator connected to the hydraulic pump.

8. The machine of claim 7, wherein the hydraulic accumulator is further connected to the hydraulic motor.

9. The machine of claim 1, further comprising a measuring device for determining a force applied by the piston to the plant matter.

10. The machine of claim 1, wherein when the machine is towed by a tractor, the rotating drive element comprises a power take-off of the tractor.

11. The machine of claim 1, wherein the machine is self-propelled.

* * * * *